United States Patent
Henkel et al.

[11] Patent Number: 6,081,222
[45] Date of Patent: Jun. 27, 2000

[54] JOINT SURVEILLANCE TARGET ATTACK SYSTEM COMBAT TRANSPONDER

[75] Inventors: Paul Arthur Henkel, Indialantic; Dale Edward Burton, Melbourne, both of Fla.

[73] Assignee: Northrop Grumman Corporation, Los Angeles, Calif.

[21] Appl. No.: 09/084,827

[22] Filed: May 26, 1998

[51] Int. Cl.[7] .......................... G01S 13/78; G01S 13/74
[52] U.S. Cl. ................................................ 342/45; 342/44
[58] Field of Search .................................. 342/42, 44, 51; 340/825.54

[56] References Cited

U.S. PATENT DOCUMENTS

| | | | |
|---|---|---|---|
| 3,750,167 | 7/1973 | Gehman et al. | 343/6.5 |
| 4,006,477 | 2/1977 | Yost, Jr. et al. | 343/6.8 |
| 4,019,181 | 4/1977 | Olsson et al. | 343/6.5 |
| 4,047,171 | 9/1977 | Fugit | 342/51 |
| 4,364,043 | 12/1982 | Cole et al. | 340/825.54 |
| 4,546,241 | 10/1985 | Walton | 235/380 |
| 4,647,931 | 3/1987 | Mawhinney | 342/44 |
| 5,269,070 | 12/1993 | Thurston | 33/533 |
| 5,278,563 | 1/1994 | Spiess | 342/44 |
| 5,453,748 | 9/1995 | Lindell | 342/51 |
| 5,509,899 | 4/1996 | Fan et al. | 604/96 |
| 5,512,899 | 4/1996 | Osawa et al. | 342/25 |
| 5,649,296 | 7/1997 | MacLellan et al. | 342/51 |

*Primary Examiner*—Ian J. Lobo
*Attorney, Agent, or Firm*—Terry J. Anderson; Karl J. Hoch, Jr.

[57] ABSTRACT

A radar transponder and transponder system is provided for providing transponder communications signals embedded within radar interrogation and reply signals. The radar interrogation signals include transponder interrogation signals embedded within the bandwidth thereof. The transponders include a receiver for extracting the transponder interrogation signal and an offset frequency generator for up-converting or down-converting the transponder interrogation signal while remaining within the bandwidth of the radar signal. The transponders may be selectively enabled in response to interrogation signals having particular frequencies and/or in accordance with preset date or time schedules. The transponder outputs may be phase coherent with the interrogation signals and generated less than 10 nsec after receipt of the transponder interrogation signal. As such, the transponder reply signals are difficult to distinguish from the radar interrogation/reply signals.

33 Claims, 2 Drawing Sheets

JOINT SURVEILLANCE TARGET ATTACK SYSTEM COMBAT TRANSPONDER

FIELD OF THE INVENTION

The present invention relates generally to transponder apparatus, and more particularly, to an improved reply radar transponder adaptable for programmable, low detectable applications to identify radar targets.

BACKGROUND OF THE INVENTION

Many identification systems are known which involve transmitting and receiving interrogator transmitting a microwave or other radio frequency signal and one or more transponders attached to a vehicle to be identified, which re-radiate the transmitted frequency, either unmodified or modified to some degree. In a military environment, such devices serve as useful sensors in battle field "friendly fire" control. Commonly, such devices include programmable encryption circuitry operative to regulate the signal characteristic of the transponder signal in accordance with an encryption code.

Various enhancements to transponder systems have been proposed which enhance the effectiveness of those systems. For example, contemporary transponders utilize frequency conversion techniques whereby the transponder radiates a reply signal at a frequency different from the radar interrogation signal. In such a manner, the transponder signal is more easily segregated from the interrogation signal and reflected ground clutter. Other conventional enhancements include the use of coherent transponders that allow the reply signal to phase track the interrogation signal. Pulse compression techniques are also commonly used in radar systems to allow radar systems to use long pulses to achieve high-radiated energy, while obtaining range resolution of short pulses.

The present invention allows the incorporation of these and other advantages and low-cost transponder system and may be selectively excited or otherwise powered in accordance with a pre-determined schedule of operation. As such, a transponder system in accordance with the present invention remain in a sleep mode until a response is desired in accordance with a preset schedule or in response to wake signals from interrogating radar. The transponder system further generates a reply signal, in response to the interrogation signal, in the same frequency band so as to be difficult to detect. The transponder system can function in cooperation with a variety of different types of antenna systems including omni-directional, mechanically steered, or electronically steered antenna systems. The system may be vehicle mounted or man portable.

SUMMARY OF THE INVENTION

A radar transponder and transponder system is provided for providing transponder communications signals embedded within radar interrogation and reply signals. The radar interrogation signals include transponder interrogation signals embedded within the bandwidth thereof. The transponders include a receiver for extracting the transponder interrogation signal and an offset frequency generator for up-converting or down-converting the transponder interrogation signal while remaining within the bandwidth of the radar signal. The transponders may be selectively enabled in response to interrogation signals having particular frequencies and/or in accordance with preset date or time schedules. The transponder outputs may be phase coherent with the interrogation signals and generated less than 10 nsec after receipt of the transponder interrogation signal. As such, the transponder reply signals are difficult to distinguish from the radar interrogation/reply signals.

BRIEF DESCRIPTION OF THE DRAWINGS

An illustrative and presently preferred embodiment of the invention is shown in the accompanying drawing in which.

DETAILED DESCRIPTION OF THE PREFERRED EMBODIMENT

The detailed description set forth below in connection with the appended drawings is intended as a description of the presently preferred embodiment of the invention, and is not intended to represent the only form in which the present invention may be constructed or utilized. The description sets forth the functions and sequence of steps of constructing and operating the invention in connection with the illustrated embodiments. It is understood, however, that the same or equivalent functions and sequences may be accomplished by different embodiments that are also intended to be encompassed within the spirit and scope of the invention.

Figure 1:
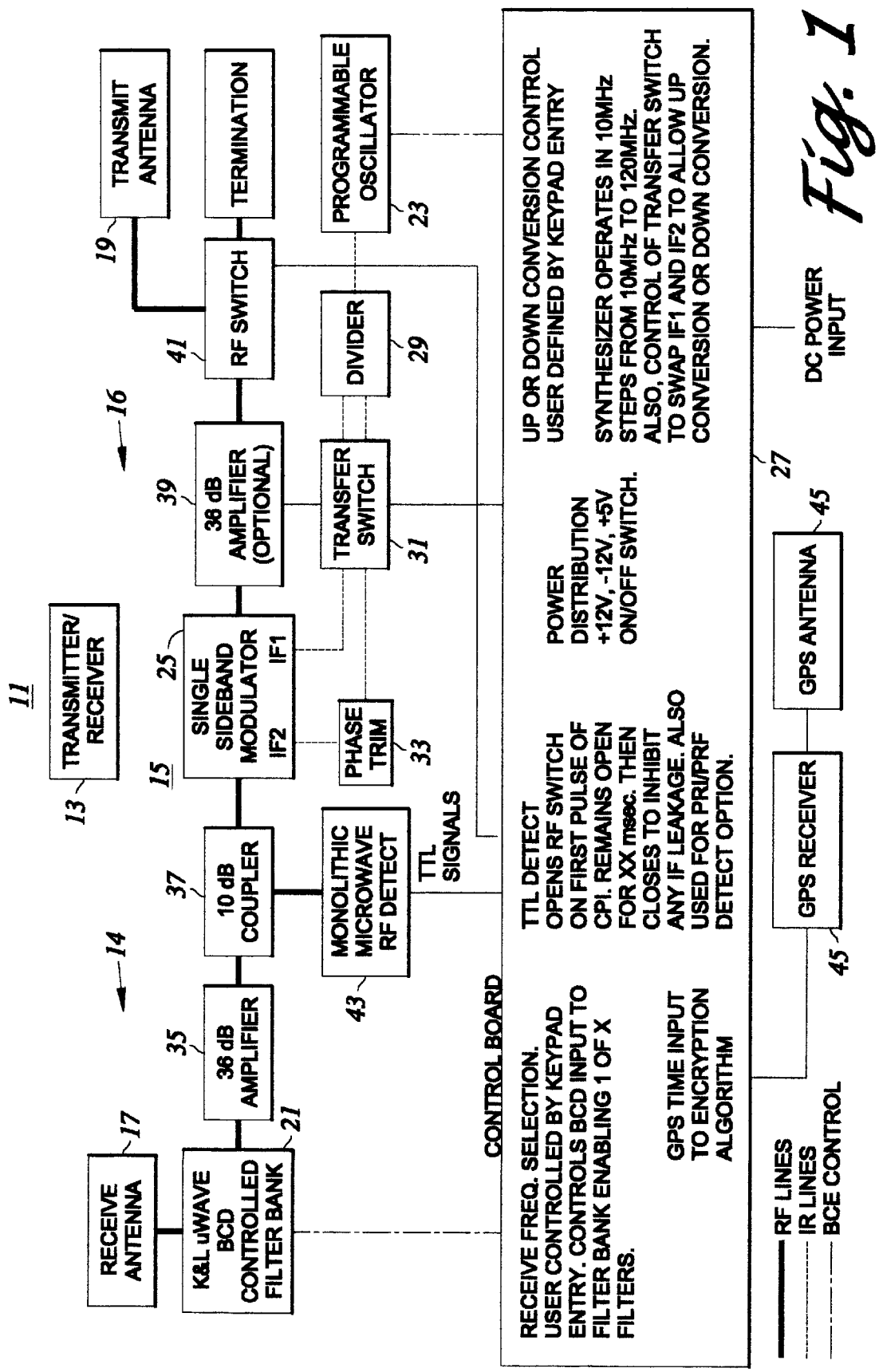
FIG. 1 is a block diagram of a radar transponder system formed in accordance with the present invention.

Referring to FIG. 1, radar transponder system 11 is illustrated. The system 11 comprises an interrogator in the form of transmitter/receiver 13, which may be mounted on an aircraft or other vehicle. The transmitter/receiver 13 is operative to generate a radio frequency interrogation signal 14, and to receive a reply signal 16. The interrogation signal 14 is communicated to transponder 15 via receive antenna 17. The reply signal is communicated from the transponder 15 via transponder transmit antenna 19.

The receive antenna 17 and transmit antenna 19 may be implemented as a variety of different types of antennas, such as an onmi-direction antenna mechanically linked to a circulator. In one embodiment, the receive antenna 17 and the transmitting antenna 19 are implemented as antennas having 80 MHz bandwidth and 6 dB gain. The interrogation signal 14 received by receive antenna 17 is communicated to a first receiver 21, operative to generate an output in response to a specific received interrogation signal. In one embodiment, receiver 21 comprises a K&L uWave BCD controlled filter bank, which may be selectively enabled by control board 27. The control board 27, in electrical communication with receiver 21, is operative to select the frequency to be passed by receiver 21, in accordance with the programmable operating characteristics of the particular transponder 15. As such, different transponders can be enabled to be responsive to different interrogation signal characteristics, e.g., frequency or modulation patterns. In such case, only transponders responsive to a particular interrogation signal or frequency will generate a reply in relation to that interrogation signal or frequency.

Figure 2:
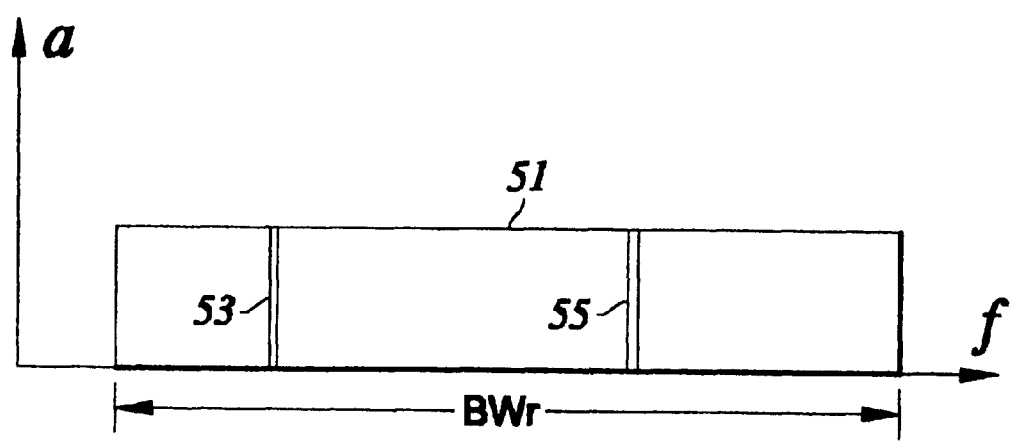
FIG. 2 is a diagram illustrating the narrow band transponder interrogation and response pulses, within the wider band radar signal.

It should be understood that the transponder interrogation signal is within the broadband of the radar interrogation signal, and therefrom difficult to detect. Referring to FIG. 2, the bandwidth of a radar signal is illustrated. Within that bandwidth, interrogation signal 53 may be selected as the particular interrogation signal to which a particular transponder 11 will respond. As such, the transmitter interrogation signal is programmably hidden within the broadband radar signal. Similarly, the reply signal of a particular transponder may also be within the broadband of the radar signal, at a particular frequency assigned to a specific transponder. As such, both the transponder interrogation signal 53 and the transponder reply signal 55 are difficult to distinguish from the broadband radar signal 51. Moreover, the response time of the transponder is made very short, preferably less than 10 msec, such that the reply signal occurs during the radar reply signal, further serving to hide the transponder of a reply signal. Additionally, as noted above, the transponder reply signal may be trimmed to be phase coherent with the interrogation signal, still further at making it more difficult to differentiate the transponder reply from the radar reply.

As noted below, the frequency of the transponder reply signal may be above or below (up conversion or down conversion) in relation to the frequency of the interrogation signal 14, at a frequency not used by the radar system. The particular transponder reply frequency may be indicative of the identity of a particular transponder, or may be common to several transponders. In such case, the reply signal may be modulated in such a way, by programmable oscillator 23, to identify a particular transponder. The reply signal may also be modulated by programmable oscillator 23 to provide additional data specific to particular applications.

The control board 27 also implements a variety of other functions. Among those functions include selective enablement of the receiver 21 in accordance with a particular time or date schedule. As such, individual transponders may lie dormant for hours or days, even when an interrogation signal of proper characteristics or frequency is received.

The offset frequency generator 23 is operative to generate a variable offset frequency signal, which is combined with a signal from receiver 21, by the combiner 25, in substantially real time. In the embodiment shown in FIG. 1, the frequency generator 23 may be implemented as a programmable oscillator, in electrical communication with combiner 25 via divider 29, transfer switch 31, and phase trim circuit 33. The phase trim circuit 33 functions to cause the transponder reply signal 16 to be phase coherent with the interrogation signal 14. The combiner 25 may be implemented as a single sideband modulator, such as the 90338-DC oscillator marketed by Anaren.

The receiver 21 is in communication with the combiner 25 via 36 dB amplifier 35 and 10 db coupler 37. In one embodiment, the 37 dB amplifiers 35, 39 may be implemented as the Model AMT-12455 amplifier marketed by Avantek. The output from the combiner 25 preferably comprises a transponder carrier frequency signal which is communicated to the transmit antenna 19 via 36 dB amplifier 39 and RF switch 41.

The variable frequency offset signal may be selected by programmable control of control board 27 in such a manner as to uniquely identify the particular transponder that is responding. In one embodiment, the control board operates to provide 10 MHz steps, between 10 MHz and 120 MHz. It should be understood that a principal feature of the present invention is to limit the offset frequency such that the reply signal 16 is within the same frequency band, albeit offset, as the interrogation signal 14. As such, the transponder reply signal 16 is difficult to detect in relation to interrogation signal 14.

A control board 27 further regulates the operation of transfer switch 31, such that the variable frequency offset signal may comprise a positive or negative offset (up conversion or down conversion) in relation to the frequency of the interrogation signal 14.

Control board 27 is further is electrical communication with RF switch 41 and monolithic microwave RF detect 43. The RF detect 43 operates to indicate that the receiver 21 has detected the presence of interrogation signal 14, having appropriate frequency characteristics and satisfying time/date criteria for passage. In response to the signal from RF detect 43, the control board opens RF switch 41 for a preset period of time. In one embodiment, the RF switch 41 is open for one msec, and then closed to prevent leakage.

The transponder may also include GPS antenna 45, operative to receive global positioning signals at satellite based global positioning signals, which are communicated to GPS receiver 47 and thereafter to control board 27. The GPS signals function to facilitate time/date criteria as may be assigned to the transponder.

It will be understood by those skilled in the art that the description above represents a single embodiment of the invention, and is not intended to constitute the only embodiment in which the invention may be implemented.

What is claimed is:

1. A radar transponder system comprising:
   a) a transmitter for transmitting wideband radar signals, said radar signals including transponder interrogation signals programmably embedded within the bandwidth of the radar signals, said interrogation signals being transmitted during transmission of said radar signals;
   b) multiple remotely located transponders, each mountable on a movable object, said transponders including:
      i) a receiver for receiving said radar signals and selectively extracting the transponder interrogation signals therefrom;
      ii) an offset frequency generator for generating a variable frequency offset signal, said offset signal being adjustable within the bandwidth of said radar signals;
      iii) a combiner for generating a combiner output in response to said extracted transponder interrogation signals and said variable frequency offset signal;
      iv) a transponder transmitter circuit in electrical communication with said combiner for transmitting a transponder reply signal, responsive to the combiner output signal, within the bandwidth of said radar signals, both said interrogation and said reply signals being within the bandwidth of said radar signals, and being transmitted during said transmission of said radar signals, to facilitate low detection of said interrogation and said reply signals.

2. The radar transponder system as recited in claim 1 wherein the radar signals have a bandwidth of approximately 100 MHz.

3. The radar transponder system as recited in claim 1 wherein the combiner is operative to up-convert the transponder interrogation signal.

4. The radar transponder system as recited in claim 1 where the combiner is operative to down-convert the transponder interrogation signal.

5. The radar transponder system as recited in claim 1 wherein the frequency generator is variable in 10 MHz increments.

6. The radar transponder system as recited in claim 1 further including a phase trim circuit in communication with the combiner, the phase trim circuit being configured to cause the transponder reply signal to be phase coherent with the transponder interrogation signal.

7. The radar transponder system as recited in claim 1 wherein the transponder reply signal occurs less than 1 msec after the transponder interrogation signal.

8. The radar transponder system as recited in claim 1 wherein the transponder reply signal occurs less than 10 msec after the transponder interrogation signal.

9. The radar transponder system as recited in claim 1 further including a programmable oscillator in communication with the combiner for generating a transponder specific reply code for modulating the transponder reply signal in accordance with a preset pattern specific to a particular transponder.

10. The transponder system in accordance with claim 1 further comprising a control board for enabling operation of the transponder only in response to a interrogation signal having predetermined signal characteristics.

11. A radar transponder mountable on a movable object, said transponder comprising:

a) a receiver for receiving radar interrogation signals and selectively extracting a transponder interrogation signal therefrom, said transponder interrogation signal being embedded within the bandwidth of said radar interrogation signals;

b) an offset frequency generator for generating a variable frequency offset signal, said offset signal being adjustable within the bandwidth of said radar signals;

c) a combiner for generating a combiner output signal in response to said transponder interrogation signal and said variable frequency offset signal;

d) a transponder transmitter circuit in electrical communication with said combiner and for transmitting a transponder reply signal, responsive to the combiner output signal, within the bandwidth of said radar interrogation signals, both said interrogation and said reply signals being within the bandwidth of said radar signals, and being transmitted during said transmission of said radar signals, to facilitate low detection of said interrogation and said reply signals.

12. The transponder as recited in claim 11 wherein the radar signals have a bandwidth of approximately 100 MHz.

13. The transponder as recited in claim 11 wherein the combiner is operative to up-convert the transponder interrogation signal.

14. The transponder as recited in claim 11 where the combiner is operative to down-convert the transponder interrogation signal.

15. The transponder as recited in claim 11 wherein the frequency generator is variable in 10 MHz increments.

16. The transponder as recited in claim 11 further including a phase trim circuit in communication with the combiner, the phase trim circuit being configured to cause the transponder reply signal to be phase coherent with the transponder interrogation signal.

17. The transponder as recited in claim 11 wherein the transponder reply signal occurs less than 1 msec after the transponder interrogation signal.

18. The transponder as recited in claim 11 wherein the transponder reply signal occurs less than 10 nsec after the transponder interrogation signal.

19. The transponder as recited in claim 11 further including a programmable oscillator in communication with the combiner for generating a transponder specific reply code for modulating the transponder reply signal in accordance with a preset pattern specific to a particular transponder.

20. The transponder in accordance with claim 11 further comprising a control board, in communication with the receiver, for enabling operation of the transponder only in response to a interrogation signal having predetermined signal characteristics.

21. A low detectable radar transponder system communicating in identical normal operating band radar signals, the system comprising:

a) a transmitter, the transmitter being operative to transmit wideband radar signals having transponder interrogation signals programmably embedded within, the interrogation signals being transmitted during transmission of the radar signals;

b) multiple remotely located transponders, the transponders being operative to receive the radar signals and selectively extract the transponder interrogations signals therefrom; and c) the transponders further being operative to transmit transponder reply signals in response to the transponder interrogation signals, the transponder reply signals being within the bandwidth of he radar signals, both the interrogation and the reply signals being within the bandwidth of said radar signals, and being transmitted during the transmission of the radar signals, to facilitate low detection of the interrogation and the reply signals.

22. The invention as set forth in claim 21 wherein the transponders further comprise a receiver for receiving the radar signals and selectively extracting the transponder interrogation signals therefrom.

23. The invention as set forth in claim 21 wherein the transponders further comprise an offset frequency generator for generating a variable frequency offset signal, the offset signal being adjustable within the bandwidth of the radar signals.

24. The invention as set forth in claim 21 wherein the transponders further comprise a combiner for generating a combiner output in response to the extracted transponder interrogation signals and the variable frequency offset signal.

25. The invention as set forth in claim 21 wherein the radar signals have a bandwidth of approximately 100 MHZ.

26. The invention as set forth in claim 21 wherein the transponder reply signal occurs less than 1 msec after the transponder interrogation signals.

27. The invention as set forth in claim 22 wherein the transponders further comprise a control board in communication with the receiver for enabling operation of the transponders only in response to a interrogation signal having predetermined signal characteristics.

28. The invention as set forth in claim 22 wherein the transponders further comprise a control board in communication with the receiver for enabling operation of the receiver only in response to a preset schedule.

29. The invention as set forth in claim 23 wherein the offset frequency generator is variable in 10 MHZ increments.

30. The invention as set forth in claim 24 wherein the combiner is operative to up-convert the transponder interrogation signals.

31. The invention as set forth in claim 24 wherein the combiner is operative to down-convert the transponder interrogation signals.

32. The invention as set forth in claim 24 wherein the transponders further comprise a phase trim circuit in communication with the combiner, the phase trim circuit being operative to cause the transponder reply signals to be phase coherent with the transponder interrogation signals.

33. The invention as set forth in claim 24 wherein the transponders further comprise a programmable oscillator in communication with the combiner for generating a transponder specific reply code for modulating the transponder reply signals in accordance with a preset pattern specific to a particular transponder.

* * * * *